United States Patent
Pflum et al.

(10) Patent No.: US 9,038,480 B2
(45) Date of Patent: May 26, 2015

(54) INTEGRATED CIRCUIT AND APPARATUS FOR DETECTING OSCILLATIONS

(75) Inventors: Marty L. Pflum, Austin, TX (US); Michael Keith Odland, Austin, TX (US); Kenneth W. Fernald, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 550 days.

(21) Appl. No.: 13/342,506

(22) Filed: Jan. 3, 2012

(65) Prior Publication Data

US 2013/0167652 A1 Jul. 4, 2013

(51) Int. Cl.
| | | |
|---|---|---|
| G01F 1/20 | (2006.01) | |
| G01F 1/716 | (2006.01) | |
| G01F 1/115 | (2006.01) | |
| G01F 1/075 | (2006.01) | |
| G01D 4/00 | (2006.01) | |

(52) U.S. Cl.
CPC ............... *G01F 1/115* (2013.01); *G01F 1/075* (2013.01); *G01D 4/00* (2013.01)

(58) Field of Classification Search
None
See application file for complete search history.

(56) References Cited

U.S. PATENT DOCUMENTS

| | | | |
|---|---|---|---|
| 4,045,728 A | | 8/1977 | Fletcher et al. |
| 4,524,276 A | * | 6/1985 | Ohtombe ............... 250/338.1 |
| 6,549,120 B1 | | 4/2003 | de Buda |
| 2009/0189778 A1 | | 7/2009 | Juan et al. |
| 2010/0302061 A1 | | 12/2010 | Winter et al. |

* cited by examiner

*Primary Examiner* — Harshad R Patel
(74) *Attorney, Agent, or Firm* — Cesari & Reed LLP; R. Michael Reed

(57) ABSTRACT

An integrated circuit includes a pulse generator to provide an excitation pulse to an output terminal and a comparator to receive a signal in response to the excitation pulse and for comparing the signal to a threshold to produce a comparator output signal corresponding to oscillations in the signal. The integrated circuit further includes a counter to count pulses in the comparator output signal and a discriminator circuit to compare a count value of the counter to a damping threshold and for providing an output signal having a first value when the count value is equal to or exceeds the damping threshold and otherwise having a second value.

18 Claims, 6 Drawing Sheets

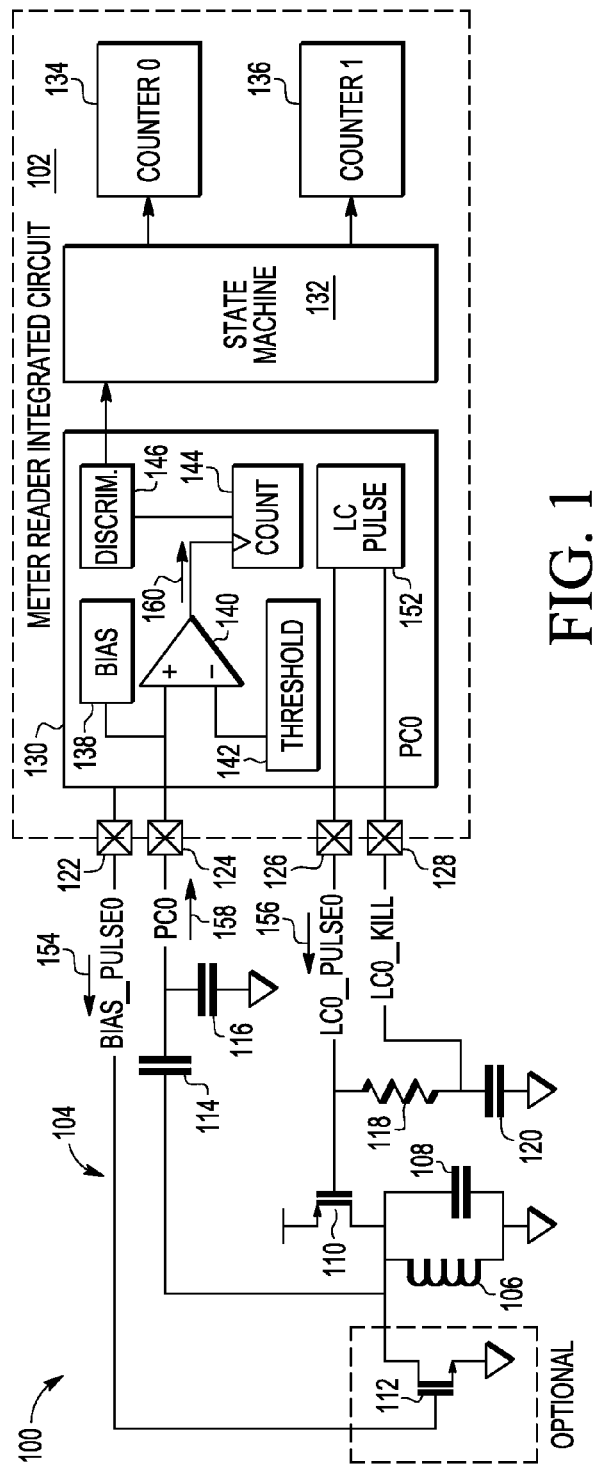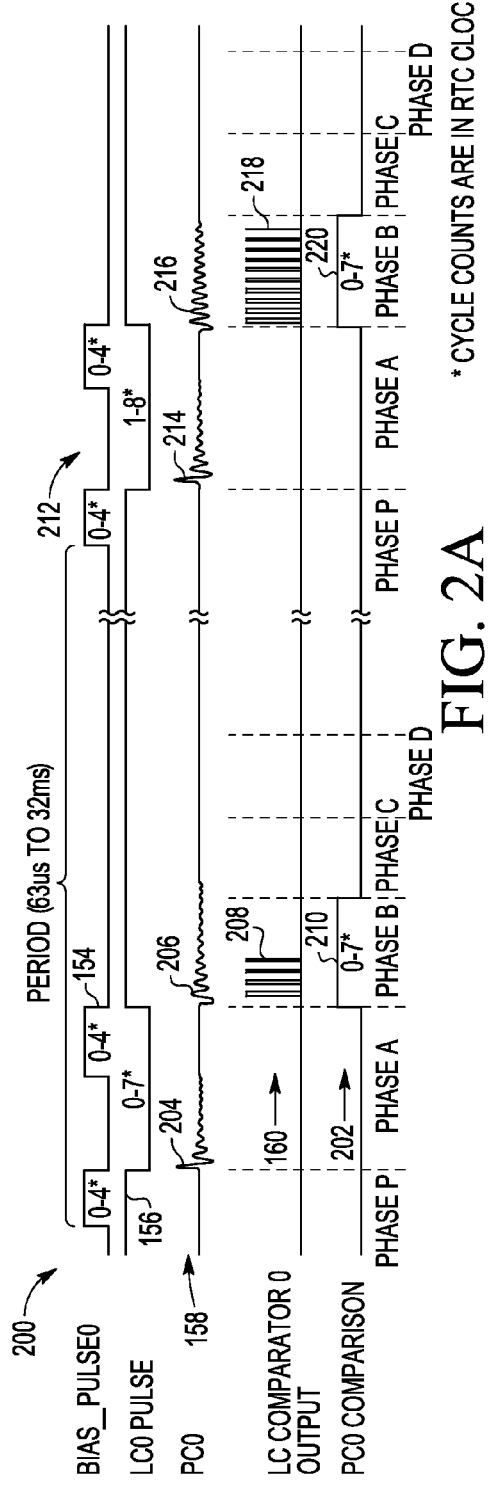
FIG. 1
FIG. 2A

INTEGRATED CIRCUIT AND APPARATUS FOR DETECTING OSCILLATIONS

FIELD

The present disclosure is generally related to meter reader circuits and, more particularly, to an integrated circuit and apparatus for detecting oscillations related to a flow meter.

BACKGROUND

Meters, such as water meters and gas meters measure the quantity and, in some cases, the flow rate of a fluid or gas flowing through the meter. Such meters often include meter registers for storing data corresponding to the volume of fluid flowing through the meter. Circuitry attached to the meter can be configured to read the stored data and to communicate the stored data to an interface, such as a visible gauge or transmitter coupled to an output port or an antenna.

SUMMARY

In an embodiment, an integrated circuit includes a pulse generator for providing an excitation pulse to an output terminal and a comparator for receiving a signal in response to the excitation pulse and for comparing the signal to a threshold to produce a comparator output signal corresponding to oscillations in the signal. The integrated circuit further includes a counter for counting pulses in the comparator output signal and a discriminator circuit for comparing a count value of the counter to a damping threshold and for providing an output signal having a first value when the count value is equal to or exceeds the damping threshold and otherwise having a second value.

In another embodiment, an apparatus for measuring fluid flow includes a resonant circuit positioned near a moveable element of a flow meter and including an input and an output. The resonant circuit is configured to produce a signal in response to an excitation pulse. The apparatus further includes an integrated circuit coupled to the input and the output of the resonant circuit. The integrated circuit applies an excitation pulse to the input and to receive the signal in response thereto. Further, the integrated circuit is configured to detect a number of oscillations of the signal that exceed a pre-determined threshold and to determine a relative position of the moveable element based the number of oscillations.

In yet another embodiment, an integrated circuit includes a pulse detector circuit having a first output and a first input configurable to couple to a resonant circuit and having a second output. The pulse detector circuit provides an excitation pulse to the first output, to receive an input signal from the first input in response to providing the excitation pulse, and to provide an output signal corresponding to a state of the resonant circuit on the second output. The integrated circuit further includes a comparator including a first input to receive a second input signal from a reed switch circuit, a second input to receive a threshold signal, and an output for providing a comparison signal. Additionally, the integrated circuit also includes a multiplexer including a first input coupled to the output of the pulse detector circuit, a second input coupled to the output of the comparator, a select input for receiving a selection signal, and an output. The integrated circuit further includes a state machine coupled to the output of the multiplexer and configured to detect motion of a movable element of a flow meter in response to one of the output signals and the comparison signal.

BRIEF DESCRIPTION OF THE DRAWINGS

FIG. 1 is a diagram of an embodiment of a flow meter system including a pulse counter circuit.

FIG. 2A is a timing diagram illustrating input and output signals of the pulse counter circuit of FIG. 1.

In the following description, the use of the same reference numerals in different drawings indicates similar or identical items.

DETAILED DESCRIPTION OF ILLUSTRATIVE EMBODIMENTS

Figure 2B:
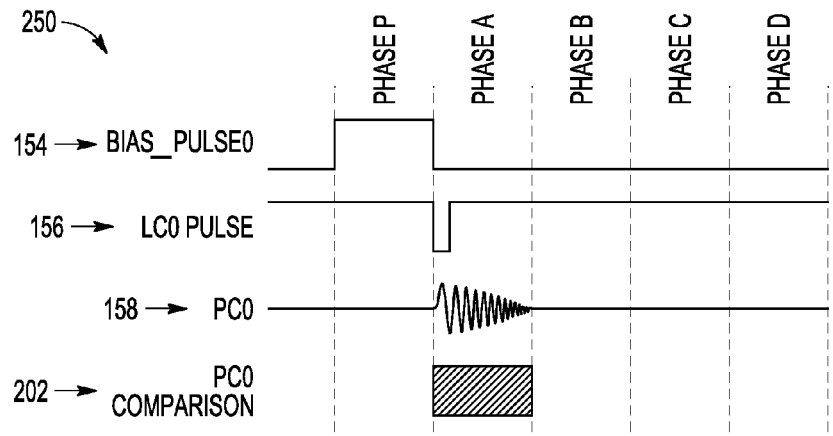
FIG. 2B is a timing diagram illustrating input and output signals of the pulse counter circuit of FIG. 1, including an excitation pulse having a shorter duration than the excitation pulse of FIG. 2A.

Embodiments of circuits are described below that are configured to sense rotation of a metering wheel of a flow meter with non-mechanical circuit elements, such as reed switches and resonant circuits. In an example, a meter reader integrated circuit is disclosed that includes inputs configurable to couple to one or more reed switches that open and close in response to a changing magnetic field associated with rotation of the metering wheel having a magnetic element attached thereto. The opening and closing of the reed switches produces signals that can be processed by a state machine to determine an amount of fluid flowing through the flow meter.

The meter reader integrated circuit further includes a pulse detector circuit having terminals configurable to couple to one or more resonant circuits. The pulse detector circuit includes a pulse generator for providing an excitation pulse to the resonant circuit through a first terminal and a comparator having a first input coupled to the resonant circuit through a second terminal for receiving an oscillating signal in response to the excitation pulse. The comparator further includes a second input for receiving a threshold and an output. The comparator produces an output signal having a logic high level each time the input signal equals or exceeds the threshold and having a logic low level otherwise. A counter includes an input coupled to the output of comparator and configured to count the oscillations, and a discriminator includes an input coupled to the output of the counter and configured to determine a state of the oscillating signal. In particular, the oscillating signal is a damped signal when a metalized region of the metering wheel is proximate to the resonant circuit during the pre-defined sampling period and is undamped when a non-metalized region of the metering wheel is proximate to the resonant circuit. Thus, the meter reader integrated circuit can utilize a count of the number of oscillations of the oscillating signal to sense rotation of the metering wheel as a function of the damped state or undamped state of the oscillations within a sensed signal. An example of a pulse counter configured to sense rotation of the metering wheel as a function of the state of the sensed signal is described below with respect to FIG. 1.

FIG. 1 is a diagram of an embodiment of a flow meter system 100 including a pulse counter circuit 102. Pulse counter circuit 102 is connected to a resonant circuit 104, which is disposed near a moving element of a fluid flow meter, such as a gas or water meter. In some instances, the moving element is a rotating wheel that has multiple regions formed from different materials, such as one or more metalized regions and one or more non-metalized regions.

Resonant circuit 104 includes a resonant (inductor-capacitor or LC) tank having an inductor 106 connected in parallel with a capacitor 108 between a drain of transistor 110 and ground. Transistor 110 includes a source connected to a power supply terminal and a gate connected to a pad 126 of pulse counter circuit 102. Resonant circuit 104 further includes a resistor 118 having a first terminal connected to pad 126 and a second terminal connected to a pad 128 of pulse counter circuit 102 and to a first electrode of capacitor 120, which has a second electrode connected to ground. The drain of transistor 110 is AC coupled to a pad 124 of pulse counter circuit 102 by capacitor 114. Capacitor 114 has a first electrode connected to the drain of transistor 110 and a second electrode connected to pad 124. Resonant circuit 104 further includes a capacitor 116 having a first electrode connected to pad 124 and a second electrode connected to ground. Optionally capacitors 114 and 116 may be omitted when the A/C coupling is not used for some designs. Resonant circuit 104 further includes an optional transistor 112 having a drain connected to the drain of transistor 110, a gate connected to a pad 122 of pulse counter circuit 102, and a source connected to ground.

Pulse counter circuit 102 includes a detector circuit 130 connected to pads 122, 124, 126, and 128 and to a state machine 132, which is connected to counters 134 and 136. Detector circuit 130 includes a comparator 140 having a first input connected to pad 124, a second input for receiving a threshold 142, and an output connected to a clock input of a counter 144. Counter 144 has an output connected to an input of a discriminator 146, which has an output connected to a state machine 132. Detector circuit 130 further includes an inductor/capacitor (LC) pulse circuit 152 connected to pads 126 and 128 for injecting an excitation pulse of programmable duration into the resonant circuit 104. Although FIG. 2A is general purpose and shows the excitation pulse taking the full width of the phase, the excitation pulse may optionally be programmed to be a fraction of the width of the phase. Detector circuit 130 further includes a bias circuit 138 configured to bias the voltage at the first input of differential amplifier 140. Bias circuit 138 may be connected to pad 122 to pre-condition the inputs to a desired voltage level by controlling transistor 112.

In an example, during a bias phase, bias circuit 138 applies a bias signal (BIAS_PULSE0) 154 of programmable duration to pad 122 to bias resonant circuit 104, and counter 144 is reset to zero. Bias signal 154 biases transistor 112 to discharge capacitor 108 and to set a voltage at the pad 124 connected to the input of comparator 140 to a desired voltage level, such as half of an input voltage level.

After the bias phase, LC pulse circuit 152 drives an excitation pulse (LCO_PULSE0) 156 of programmable duration onto pad 126 to excite resonant circuit 104. Comparator 140 receives an input signal (PC0) 158 including a plurality of oscillations from resonant circuit 104 via pad 124, and compares the oscillations of the signal to threshold 142 to detect oscillations. Input signal 158 can be a sinusoidal signal having a characteristic damping that is affected by proximity of metalized or non-metalized portions of a rotating wheel relative to resonant circuit 104. In one example, comparator 140 detects peaks of the signal that exceed threshold 142. In another example, comparator 140 detects valleys in the signal that fall below threshold 142. In still another example, comparator 140 detects each oscillation as the signal crosses the threshold. Comparator 140 produces an output signal 160 corresponding to the detected oscillations, which output signal 160 is used to clock counter 144 to count the number of oscillations. In general, the counter 144 is responsive to a control signal that is applied for a programmable compare-time interval that enables the counter 144 to count pulses at the output of comparator 140 during the interval. At the end of the compare-time interval, discriminator 146 checks the value of counter 144 to determine if the number of counts represents a damped oscillation or an undamped oscillation, corresponding to a metalized region or a non-metalized region of the rotating wheel, respectively, that is proximate to the resonant circuit(s). A damped oscillation will result in fewer counted oscillations or peaks relative to the undamped oscillation.

In one example, discriminator may be programmed with a damping threshold of a number (N) of oscillations. If the count value of counter 144 at the end of the compare-time interval represents N oscillations or more, state machine 132 treats this as a high value corresponding to an undamped state associated with a non-metalized region of the rotating wheel. Otherwise, state machine 132 treats the value as a low value corresponding to a damped state associated with a metalized region of the rotating wheel. State machine 132 updates the counters 134 and 136 accordingly in order to track rotation of the rotating wheel.

In an example, after the high and low value of the signal, counter 144 samples the output of comparator 140, then rests for a programmed period of time before repeating the sampling process. In the illustrated example of FIG. 1, a single-channel, non-quadrature implementation is shown where discriminator 146 compares the count value of counter 144 to a threshold and provides an output value of a logic "1" or a logic "0" to state machine 132, which uses the transitions of the output values to increment the counters. In this instance, the value "1" represents an undamped state corresponding to a non-metalized region of the rotating wheel adjacent to the resonant circuit 104, while the value "0" represents a damped state corresponding to a metalized region of the rotating wheel adjacent to the resonant circuit 104.

In the illustrated example, only the PC0 channel is shown that is connected to pad 124. A second channel may be connected to resonant circuit 104 or to another resonant circuit, and the outputs from the two channels can be provided to the state machine 132 to determine a direction of rotation. For example, when a transition in the first channel leads a transition in the second channel, the state machine 132 may interpret the timing of the transition edges to mean that the rotating wheel is turning in a clockwise direction, whereas when the transition in the first channel lags behind the transition in the second channel, the state machine 132 interprets the timing to mean that the rotating wheel is turning in a counter-clockwise direction. In this instance, state machine 132 can increment counter 134 for clockwise rotation and counter 136 for counter-clockwise rotation, making it possible to determine fluid flow through a flow meter.

In some instances, the user may want to control the excitation pulse to of the resonant circuit. Pulse counter circuit 102 includes a pad 128 that is coupled to the resonant circuit 104 and that can be used to receive a signal from the resonant circuit 104 to terminate the excitation pulse.

While the discussion of FIG. 1 has largely focused on the structure of pulse counter circuit 102, it is useful to understand the operation from the perspective the timing of signals. An example of the signal timing is described below with respect to FIGS. 2A and 2B.

FIG. 2A is a timing diagram 200 illustrating input and output signals of the pulse counter circuit pulse counter circuit 102 of FIG. 1. Timing diagram 200 depicts five zones or phases, including a pre-condition phase P and phases A, B, C, and D, which phases allow for a variety of external inductor/capacitor (LC) configurations. Pulse counter circuit 102 applies pulses and control signals to excite the resonant circuit in one phase and to count oscillations in another. The timing of the phases, the polarity, and the compare regions are programmable. In this example, the phases have been programmed to different multiples of the real time clock (RTC) period. The bias pulse (Bias_pulse0) 154 is used to set pad 122 and the first input of comparator 140 to a voltage of half of the input voltage (VIO/2). Bias pulse 154 is also used externally to precondition the resonant circuit 104. Excitation pulse (LC0_pulse) 156 can be programmed to be applied during phase A/phase C and used to excite resonant circuit 104. The excitation pulse may optionally be a fraction of the width of phase A or phase C. The polarities of bias pulse 154 and excitation pulse 156 are also programmable. Once resonant circuit 104 is excited, comparator 140 can be enabled to detect when the dampened sinusoidal signal on pad 124 crosses a programmable threshold. Counter 144 attached to the output of the comparator 140 counts pulses on the output of comparator 140 during a selected one of phases A, B, C, or D. At the end of phase D, discriminator 146 compares a count value of counter 144 to a programmed digital threshold (such as count threshold 308 in FIG. 3) to discriminate between a dampened or undamped state and send a "0" or "1" to the state machine 132. Depending on the mode (single, dual, or quadrature), the state machine 132 will increment the two counters 134 and 136. For quadrature mode, the information from two resonant circuits (such as resonant circuit 104) can be used to decide the direction of rotation of the rotating wheel and either increment counter 134 for clock-wise rotation or counter 136 for counter clock-wise rotation.

In pre-conditioning phase (Phase P), a bias pulse signal 154 is applied to pad 122, conditioning the resonant circuit 104 to a known state. In a first phase (Phase A), pulse counter circuit 102 removes the bias pulse signal 154 and transitions a signal on pad 126 to provide an excitation pulse (LC0_Pulse0) 156, exciting resonant circuit 104, which produces signal 158 at pad 124 that includes oscillations (generally indicated at 204). During phase A, bias circuit 138 may optionally apply another bias signal (BIAS_PULSE0) 154 to pad 122.

In a next phase (phase B), bias circuit 138 stops applying bias signal 154 and LC pulse circuit 152 transitions the excitation signal causing resonant circuit 104 to generate oscillations (generally indicated at 206) in the signal 158. During phase B, comparator 140 compares the oscillations to threshold 142, producing pulses 208 in output signal 160 each time the oscillations exceed threshold 142 and clocking counter 144 to count the number of oscillations. During phase B, a comparison signal 202 includes a pulse 210 having a pre-defined duration that enables comparator 140 to detect the oscillations, counter 144 to count the pulses 208, and discriminator 146 to compare the counter value to a threshold to determine a state of the rotating wheel. In phase B, counter 144 counts four pulses, which is less than a count threshold at the discriminator 146, which provides a zero to state machine 132.

In this particular example, phases C and D are depicted, which are used as rest phases before a next pre-conditioning phase (generally indicated at 212). During pre-conditioning phase 212, a bias pulse 154 is applied while the excitation pulse 156 transitions from high to low, causing oscillations 214 during phase A. At the end of phase A, another bias pulse 154 may optionally be applied while the excitation pulse 156 transitions from low to high at the beginning of phase B, which excitation pulse causes the resonant circuit 104 to produce oscillations (generally indicated at 216) in signal 158. During phase B, a comparison signal 202 includes a pulse 220 having a pre-defined duration that enables comparator 140 to detect the oscillations, counter 144 to count the pulses 208 at the output of comparator 140, and discriminator 146 to compare the counter value to a threshold to determine a state of the rotating wheel. In phase B, counter 144 counts ten pulses, which count exceeds the count threshold at the discriminator 146. In response thereto, discriminator 146 provides a one to state machine 132.

In the example of FIG. 2A, the diagram shows an excitation pulse 156 that is one RTC clock cycle wide with ringing in signal 158 on both transition edges. However, transistor 110 dampens the oscillating signal from the resonant circuit 104, which is why pulse 204 is smaller than pulse 206. While the example of FIG. 2 represents the general case, in another example, a shorter excitation pulse 156 is used and transistor 110 does not dampen against the resonant signal from resonant circuit 104 because the duration of excitation pulse 156 is short. An example of a timing diagram showing the shorter excitation pulse duration is described below with respect to FIG. 2B.

FIG. 2B is a timing diagram 250 illustrating input and output signals of the pulse counter circuit of FIG. 1, including an excitation pulse 156 having a shorter duration than the excitation pulse of FIG. 2A. Diagram 250 includes bias pulse 154, excitation pulse 156, signal 158, and a counter enable or PC0 comparison signal 202. In this instance, during the pre-conditioning phase P, bias pulse 154 transitions from low to high and back to low. At the beginning of phase A, excitation pulse 156 transitions briefly from a logic high level to a logic low level and back to high, exciting the resonant circuit and causing ringing in the signal 158. During phase A, the counter circuit is enabled via counter enable 202 to count the oscillations in signal 158. In this example, the excitation pulse 156 is less than half of the period of phase A, which is sufficient to excite resonant circuit 104 without providing so much energy that transistor 110 fights against the resonant circuit 104.

While the above discussion mentions a quadrature implementation, a single resonant circuit 104 and a single counter 144 are depicted in FIG. 1. However, to implement the quadrature example, two resonant circuits and two separate bias and counter circuits can be included. Optionally, a single comparator could be used with two counters that count on different phases. While this method saves a comparator, additional circuitry would be used to switch the signals input to the comparator between two LC tank circuits. One possible example of a meter reader circuit that can receive two signals from one or two resonant circuits is described below with respect to FIG. 3.

Figure 3:
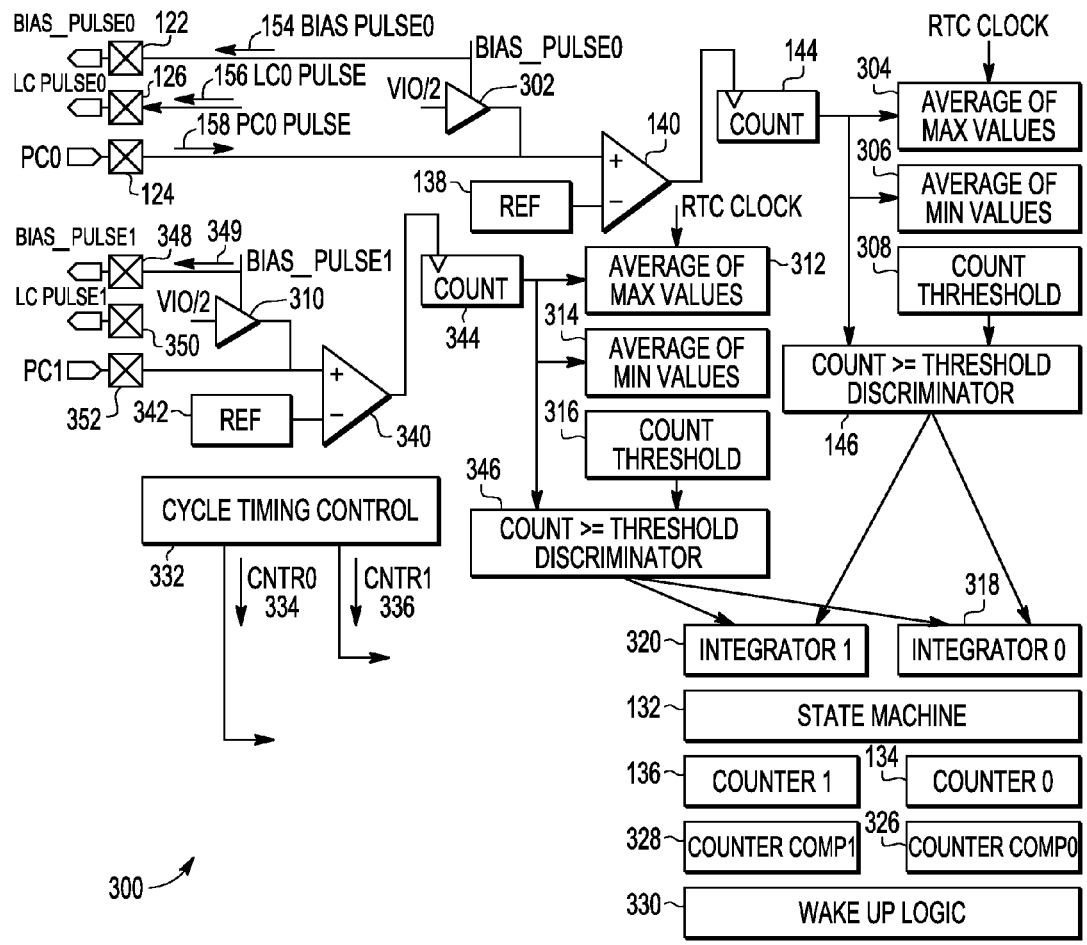
FIG. 3 is a block diagram of an embodiment of a pulse counter circuit configured to receive a pair of signals.

FIG. 3 is a block diagram of an embodiment of a pulse counter circuit 300 configured to receive a pair of signals. Pulse counter circuit 300 includes all of the elements of pulse counter circuit 102 in FIG. 1 as well as other circuit components. Pulse counter circuit 300 includes pads 122, 124, and 126 configurable to couple to a resonant circuit 104, and pads 348, 350, and 352 configurable to couple to resonant circuit 104 or to another resonant circuit. Pulse counter circuit 300 includes a bias circuit having a buffer 302 for receiving a first bias pulse and having an output coupled to a first input of comparator 140, which has a second input for receiving a threshold 142 (reference voltage) and an output coupled to a clock input of counter 144. The first input of comparator 140 is also coupled to pad 124. The first bias pulse is also provided to pad 122 for biasing resonant circuit 104. Pulse counter circuit 300 further includes a bias circuit including a buffer 310 for receiving a second bias pulse 349 and including an output coupled to a first input of comparator 340, which has a second input for receiving a reference voltage 342, and an output coupled to a clock input of a counter 344. The first input of comparator 340 is also coupled to pad 352. The second bias pulse 349 is also provided to pad 348.

Counter 144 includes an output that is provided to discriminator 146, which uses a count threshold 308 to determine when the number of oscillations represents a damped state versus when the number represents an undamped state. Counter 344 includes an output that is provided to discriminator 346, which uses a count threshold 316 to determine when the number of oscillations represents a damped state versus when the number represents an undamped state.

Further, the outputs of counter 144 can be used to store the maximum count values 304 and 312 and used to store the minimum count values 306 and 314. In some instances, such values can be utilized to refine or adjust the thresholds to eliminate false "damped state" detections.

The outputs of discriminators 146 and 346 are provided to integrators 318 and 320, which have outputs coupled to state machine 132. State machine 132 is configured to update counters 134 and 136. Pulse counter circuit 300 further includes counter comparators 326 and 328 having inputs coupled to counters 134 and 136 and outputs coupled to wake up logic 330. Pulse counter circuit 300 also includes cycle timing control circuit 332, which provides control signals 334 and 336 to enable counters and discriminators during selected phases, such as phase A and phase B as depicted, for example, in FIGS. 2A and 2B.

In an example, the bias circuit drives the voltage on pad 124 to a mid-rail voltage (VIO/2) and drives the voltage on pad 352 to the mid-rail voltage (VIO/2). By driving the pads 124 and 352 to the mid-rail voltage, electrostatic discharge (ESD) circuit clipping that otherwise would occur if the signal is oscillating around zero volts or around the input voltage (VIO). In particular, the ESD circuitry (not shown) that is connected to the input pads 124 and 352 will clip voltages above an input voltage (VIO), such as 5.25V, and below −0.3V. Therefore, the input of comparator 140 can be pre-biased at half of the input voltage (VIO/2) to limit clipping. In this example, the bias pulse 154 and the bias pulse applied to pad 348 has the same timing as buffers 302 and 310 and can be used to condition external signals before the excitation pulses are applied to pads 126 and 350, respectively. The excitation pulses are used to drive an external transistor (such as transistor 110 in FIG. 1) to energize an external resonant circuit, such as resonant circuit 104.

The counters are reset during the bias pulse cycle. After the rising and falling edge of the pulse, counters 144 and 344 are clocked with the output of comparators 140 and 340, respectively. Once the compare cycles have completed, the count values of counters 144 and 344 are checked against count thresholds 308 and 316 by discriminators 146 and 346, respectively, to decide if each of the count values should be treated as a damped value or an undamped value. The integrators 318 and 320 accept discriminator outputs 146 and 346, sampled and held outputs from 140 and 340, or read switch comparator outputs 610 and 616. In some instances, the design may not use integrator functions of integrators 318 and 320 and integrators 318 and 320 can be omitted, disabled, or bypassed. Wake up logic 330 can wake up the associated circuitry from a sleep mode once the counters 134 or 136 reach a programmed digital comparison value as determined by counter comparators 326 and 328.

In one example where the resonant circuit 104 is connected to pads 124 and 352, pulse detector circuit 102 pulses external resonant circuit 104 with an excitation signal, such as excitation signal 156, and counters 144 and 344 detect the number of oscillations from a dampened sine wave at pad 124 and pad 352. A discriminator circuit, including discriminator 146 and discriminator 346, compares the number of counts against a digital threshold (count thresholds 308 and 316, respectively) to decide if the resonant circuit 104 is in the damped or undamped region of a rotating wheel.

Figure 4:
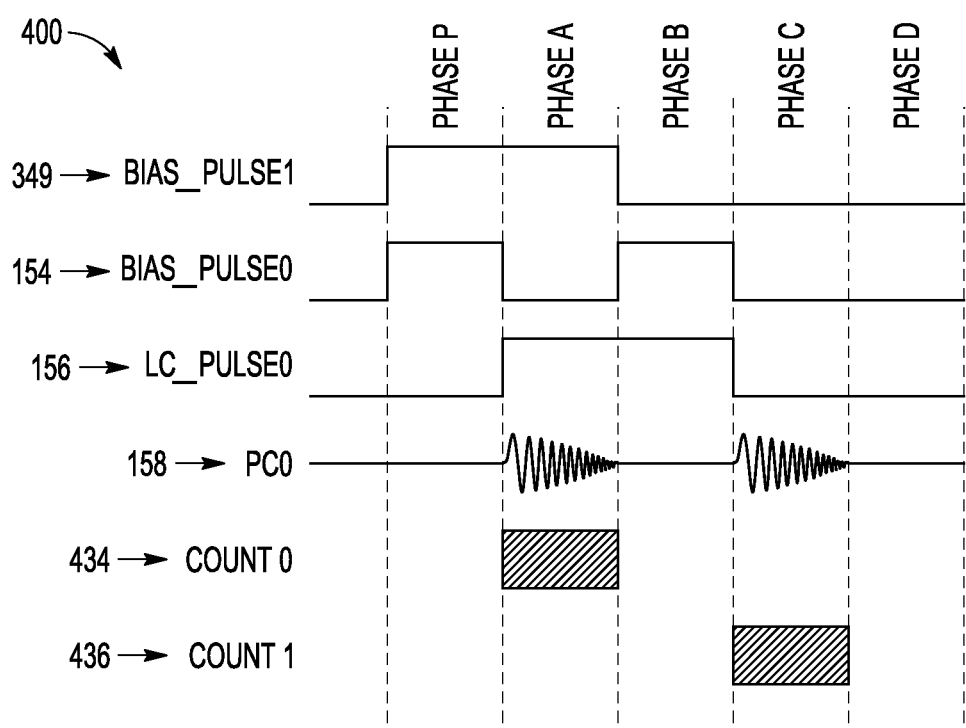
FIG. 4 is a timing diagram illustrating output and control signals for the pulse counter circuit of FIG. 3.

FIG. 4 is a timing diagram 400 illustrating output and control signals for the pulse counter circuit 300 of FIG. 3. In this example, the timing diagram 400 corresponds to an embodiment of pulse counter circuit 300 that has two resonant tank circuits (such as resonant tank circuit 104) that are AC coupled to the pulse counter circuit 300. In this instance, the pulse counter circuit 300 uses a single comparator for both resonant tank circuits (such as by switching the input from one resonant tank to the other), making it possible to detect the oscillations while reducing overall power consumption (as compared to a circuit that used two separate comparators and associated circuitry). Timing diagram 400 includes a bias pulse signal 154, a bias pulse signal 349, an excitation signal 156, a received signal (signal 158), and counter signals 434 and 436. For this example, during the pre-conditioning phase P and phase A, bias pulse signal 349 is at a logic high level. During the pre-conditioning phase, the bias signal 154 transitions from a logic low level to a logic high level and remains at logic high until the end of the pre-conditioning phase P. At the beginning of phase A, bias pulse 154 transitions from a logic high level to a logic low level, and the excitation pulse signal 156 transitions to a logic high level. Counter signal 434 enables counter 134 in FIG. 1 to count oscillations in signal 158 during phase A. These oscillations are caused by the rising edge transition of excitation pulse 156. In phase B, bias pulse 349 transitions from a logic high level to a logic low level, biasing the second resonant tank circuit. At the beginning of phase C, the excitation pulse signal 156 transitions from a logic high level to a logic low level, exciting the second resonant tank circuit. Counter signal 436 enables counter 344 to count oscillations in signal 158 during phase C. The phase cycle can then be repeated. In this example, the oscillations in signal 158 are triggered by rising and falling edge transitions of the excitation signal 156.

Figure 5:
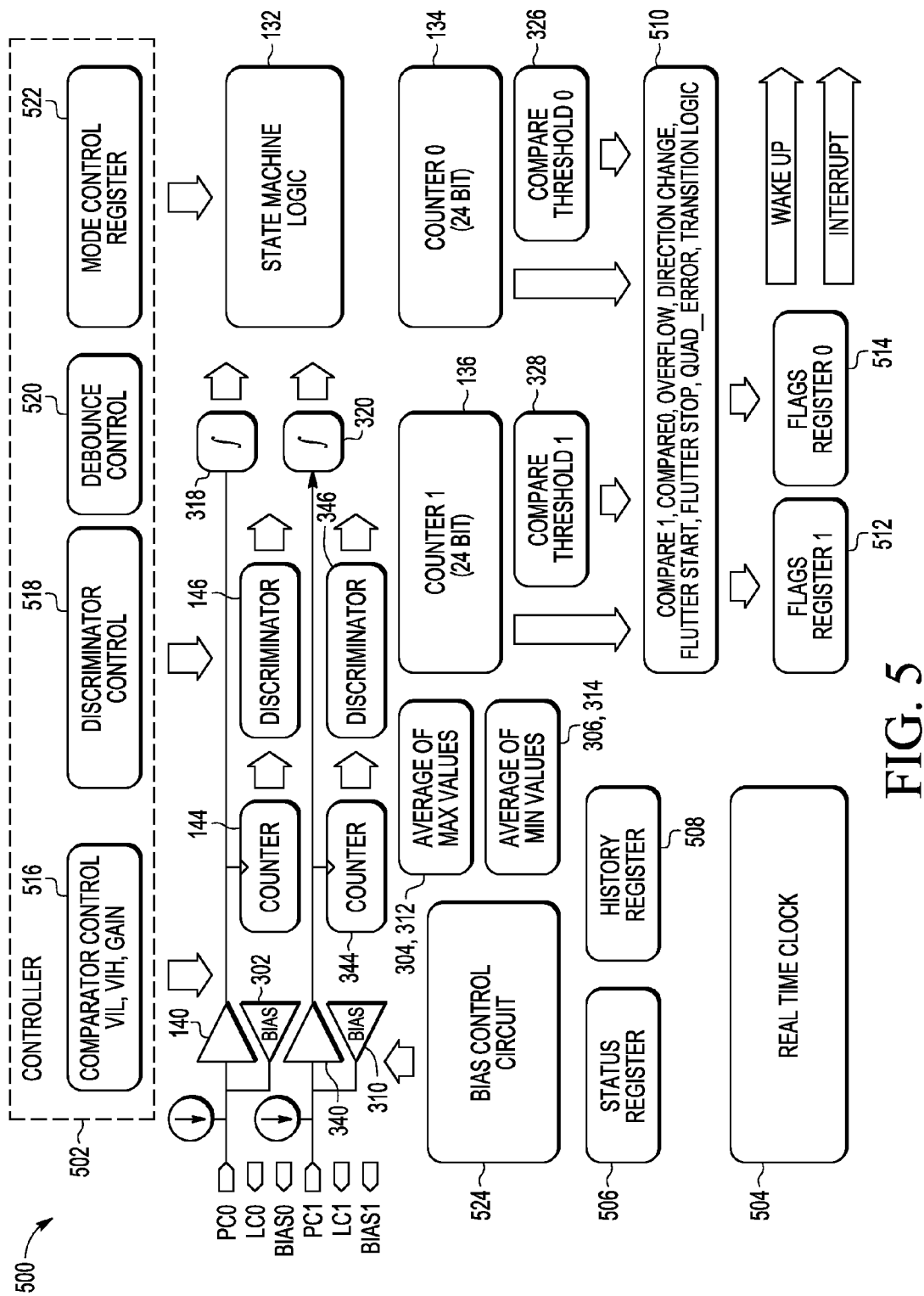
FIG. 5 is a block diagram of an embodiment of the pulse counter circuits of FIGS. 1 and 3.

FIG. 5 is a block diagram of an embodiment of a pulse counter circuit 500, such as the pulse counter circuits 102 and 300 of FIGS. 1 and 3. Pulse counter circuit 500 includes all of the elements of pulse counter circuit 300 and includes a controller 502, a real time clock 504, a status register 506, a history register 508, comparison logic 510 (such as counter comparators 326 and 328 in FIG. 3), and flags registers 512 and 514, which store results of the comparisons.

Controller 502 includes a comparator control circuit 516 that controls the thresholds of comparators 140 and 340, such as the input voltage low, input voltage high, and range levels. Further, controller 502 includes a discriminator control circuit 518 that controls the thresholds of discriminators 146 and 346, making it possible to adjust the count threshold for detecting a damped or undamped state. Controller 502 further includes a debounce control circuit 520 that controls the integrators 318 and 320, making it possible to selectively bypass the integrators, if necessary. Controller 502 further includes a mode control register 522 which stores one or more fields for controlling the operating mode of state machine 132, including controlling state machine 132 to process signals in a single mode, dual mode, or quadrature mode, as desired.

Pulse counter circuit 500 further includes a real time clock (RTC) for providing timing signals that can be used by controller 502 to selectively enable the counters 144 and 344 and discriminators 146 and 346 at appropriate phases of the excitation and pulse detection cycle. Further, pulse counter circuit 500 includes a status register 506 for storing current values and a history register 508 for storing values over time. Additionally, pulse counter circuit 500 includes a bias control circuit 524 for controlling bias circuits 302 and 310, including pull-up control and driver strength. Further, bias control circuit 524 controls the duration and strength of the bias pulses, including excitation pulse 156 and bias pulse 154.

As discussed above, duration and polarity of the various pulses can be programmed. Bias control circuit 524 controls such pulses, and utilizes register values or fields to determine such settings. Further, controller 502 can program the thresholds 142 and 342 of comparators 140 and 340, the thresholds 308 and 316 of discriminators 146 and 346, and the values of compare thresholds 326 and 328.

Figure 6:
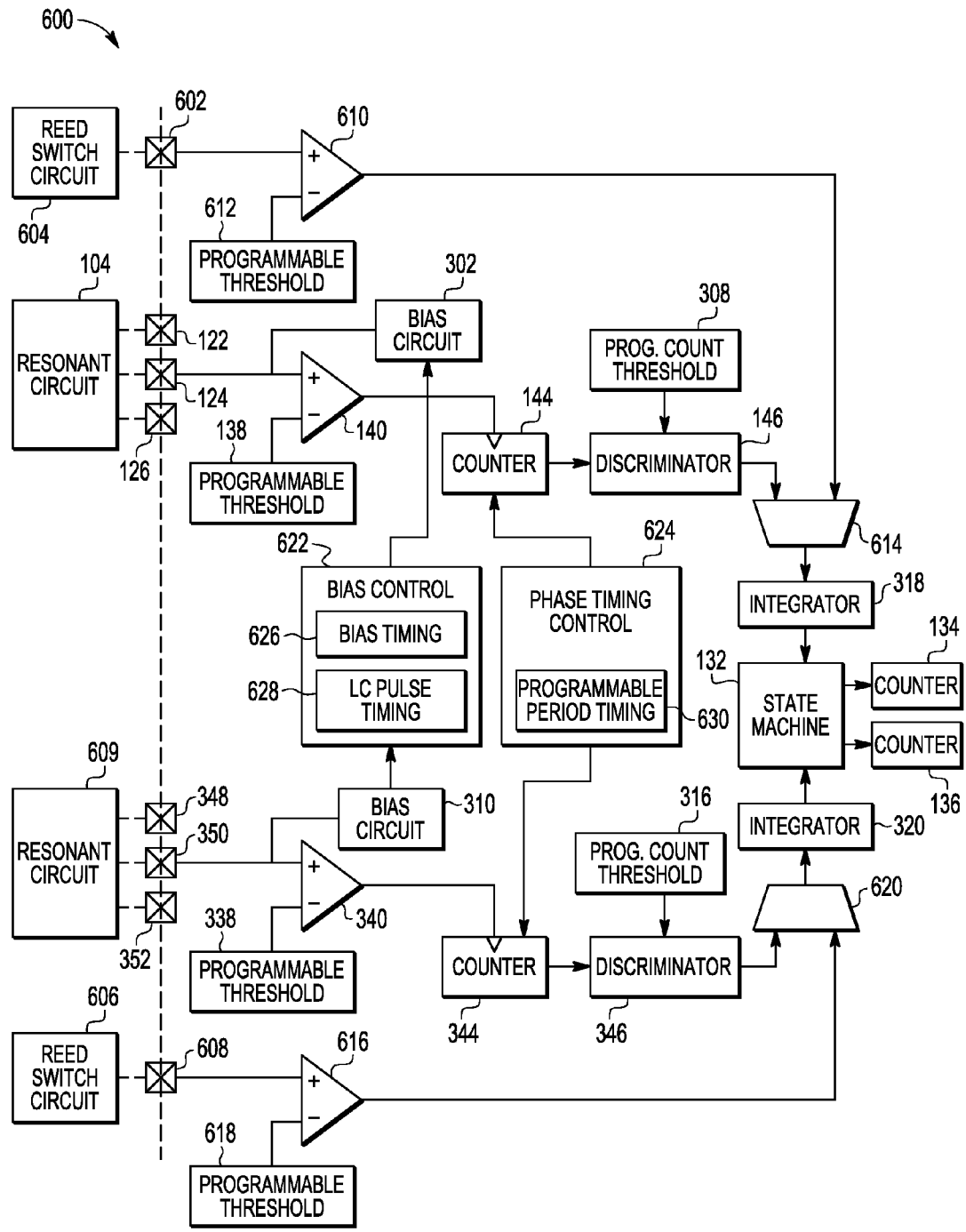
FIG. 6 is a diagram of an embodiment of a meter reader integrated circuit including the pulse counter circuits of FIGS. 1, 3 and 5 configurable to couple to a reed switch or a resonant circuit.

FIG. 6 is a diagram of an embodiment of a meter reader integrated circuit 600, including the pulse counter circuits 102, 300, and 500 of FIGS. 1, 3 and 5, which is configurable to couple to a reed switch or a resonant circuit. Meter reader integrated circuit 600 includes pads 602, 122, 124, 126, 348, 350, 352, and 608. Pad 602 is configured to couple to a reed switch circuit 604. Pad 608 is configured to couple to a reed switch circuit 606. Pads 122, 124, and 126 are configured to couple to resonant circuit 104, and pads 348, 350, and 352 are configured to couple to resonant circuit 609.

Meter reader integrated circuit 600 includes a comparator 610 including a first input coupled to pad 602, a second input for receiving a programmable threshold 612, and an output coupled to a first input of multiplexer 614. Multiplexer 614 includes a second input coupled to the output of discriminator 146 and includes an output coupled to integrator 318. Meter reader integrated circuit 600 includes a comparator 616 having a first input coupled to pad 608, a second input for receiving a programmable threshold 618, and an output coupled to a first input of a multiplexer 620. Multiplexer 620 includes a second input coupled to the output of discriminator 346 and includes an output coupled to integrator 320. Depending on the operating mode of meter reader integrated circuit 600, multiplexer 614 selectively couples one of the count of oscillations of resonant circuit 104 or reed switch circuit 604 to state machine 132 through integrator 318. Similarly, depending on the operating mode, multiplexer 620 selectively couples one of the count of oscillations of resonant circuit 609 and reed switch circuit 606 to state machine 132 through integrator 320.

Meter reader integrated circuit 600 further includes a bias control circuit 622 and a phase timing control circuit 624. Bias control circuit 622 includes a bias timing module 626 and an excitation pulse timing module 628 to control timing of the application of bias signals, such as bias pulse 154, and of excitation pulses, such as excitation pulse 156. Phase timing control circuit 624 includes programmable period timing module 630 configurable to divide the sample period into multiple phases of adjustable duration, as discussed above.

While the previous discussion of the phases depicted phases mostly of substantially equal duration in terms of RTC clock cycles, it should be appreciated that the duration of the various phases may be different, such that, for example, the pre-conditioning and/or bias and excitation phases may be shorter than sampling phases.

In an example, integrators 318 and 320 are asymmetric, which allow for a different setting for high or low detection. In an example a setting register includes a programmable field for setting the number of cumulative good samples seen by the integrators 318 and 320 before recognizing the input as low or high. Alternatively, the settings can be configured to disable integrators 318 and 320 allowing the outputs of multiplexer 614 and 620 to pass directly to state machine 132.

In an example, pulse counter circuitry including the circuitry depicted in pulse counter circuits 102, 300, and 500 of FIGS. 1, 3 and 5 includes a low-power, high-voltage logic block that operates within the RTC clock domain. Further, meter reader integrated circuit 600 can either be used with digital inputs, with switch topology circuits (i.e., reed switches), or with LC resonant circuits. For reed switch circuits 604 and 606, meter reader integrated circuit 600 charges 1 or 2 external lines by pulsing different size pull up resistors (not shown) and then detecting the associated reed switch's open or close state. Meter reader integrated circuit 600 also supports external LC resonant circuits, such as resonant circuits 104 and 609, which are periodically energized to produce dampened sine wave signals that can be used to count the number of oscillations that cross a programmable threshold. Discriminator circuits 146 and 346 then decide if resonant circuits 104 and 609, respectively, are proximate to metalized or non-metalized portions of a rotating wheel, which have different impacts on the damping of the sinusoidal signal. The metalized region of the rotating wheel dampens the oscillating signal, while the non-metalized region of the rotating wheel does not. Accordingly, discriminator circuits 146 and 346 determine whether the resonant circuits 104 and 609 are proximate to the metalized or non-metalized region of the rotating wheel, thereby detecting rotation of the rotating wheel based on the counted number of counted oscillations being either above or below a certain programmed digital damping threshold (programmable count thresholds 308 and 316).

In an example, in a first mode when the meter reader integrated circuit 600 is connected to reed switch circuits 604 and 606, which include reed switches that open or close in response to changes in a magnetic field caused by rotation of the rotating wheel, producing a signal at pads 602 and 608. In operation, the closing and opening of switches causes a phenomenon called "switch bounce", which produces a waveform that oscillates before settling to a value that represents the position of the switch (e.g., open or closed). In the worst case, the signal bounces high at each sample point and the integrator waits until the switch bounce settled. Accordingly, a minimum pulse width for the bias and excitation pulses allow sufficient settling time to account for the debounce time. In a particular example, the minimum pulse width can be approximately twice the debounce time.

In another example, flutter detection can be used with either quadrature or dual mode when the two inputs (e.g., the signals on pads 602 and 608) are expected to be in step. Flutter means that one input signal continues toggling while the other input signal stops toggling, which may indicate a broken reed switch or a pressure oscillation when the wheel magnet stops at just the right distance from the reed switch of one of reed switch circuits 604 and 606. If a pressure oscillation causes a slight rotational oscillation in the wheel, it could cause a number of pulses on one of the inputs but not on the other. All four transition edges are checked (PC1 positive, PC1 negative, PC0 positive, and PC0 negative).

For use with external inductor/capacitor resonant circuits, such as resonant circuits 104 and 609, pulse counter circuitry includes phase timing control circuit 624, which controls the counters 144 and 344 and timing of bias control circuit 622 to bias and/or excite the resonant circuits 104 and 609 during appropriate phases and to count the resulting oscillations in other phases. In a particular example, phase timing control divides the operating time of the circuit into five phases, including a pre-conditioning phase (P) and excitation phases (A and C) and compare phases (B and D). The pre-conditioning phase (P) allows for a variety of external LC configurations. Phase timing control 624 controls the timing and period of the phases. Further, the excitation phases (A and C) and compare phases (B and D) are programmable and the timing of excitation/bias and comparison could be programmed, including by adding additional phases, by dividing a selected phase into an excitation portion and a compare portion, and/or by adjusting timing of one or more of the phases independent of the other phases.

In another embodiment, the excitation pulse could take a small fraction of the width of phase A followed by the comparison during the remainder of phase A.

In a particular example, the external resonant circuit 104 is coupled to pads 122, 124, 126, and to pads 348, 350, and 352 to utilize both counters 144 and 344 to detect oscillations from a single resonant circuit 104. In this example, resonant circuit 104 is pulsed with an excitation signal 156, and a control signal from phase timing control 624 enables counter 144 and counter 344 to detect the number of oscillations from a dampened sine wave at pads 124 and 350. Discriminator circuits 146 and 316 compare the numbers of oscillations against digital thresholds 308 and 316 to decide if the resonant circuit 104 is proximate to the metalized or non-metalized region of a rotating wheel. Alternatively, counter 344 can be connected to the output of comparator 140. Since both counters 144 and 344 are connected to comparator 140 for this example, the comparator 340 can be disabled to save power.

In the above discussion, the meter reader integrated circuit 600 is depicted as having two counters 144 and 344 for counting oscillations. However, the meter reader integrated circuit 600 can include separate counters for rising and falling edges of the signals. Further, while meter reader integrated circuit 600 is depicted as being connected to two reed switch circuits 604 and 606 and to two resonant circuits 104 and 609, in a standard configuration, the meter reader integrated circuit 600 is configured to couple to either external reed switch circuits or resonant circuits. In some instances, the meter reader integrated circuit 600 may be coupled through multiple inputs to a single resonant circuit.

In the illustrated example, meter reader integrated circuit 600 is coupled to resonant circuits 104 and 609. Timing of bias, excitation, and sampling is controlled by phase timing control 624. In one instance, meter reader integrated circuit 600 pre-conditions resonant circuit 104 during a pre-conditioning phase P, provides time for the resonant circuit to settle during phase A, and samples the oscillating signal from resonant circuit 104 in phase B. An example of a timing diagram depicting excitation and sampling of the resonant circuits 104 and 609 is described below with respect to FIG. 7.

Figure 7:
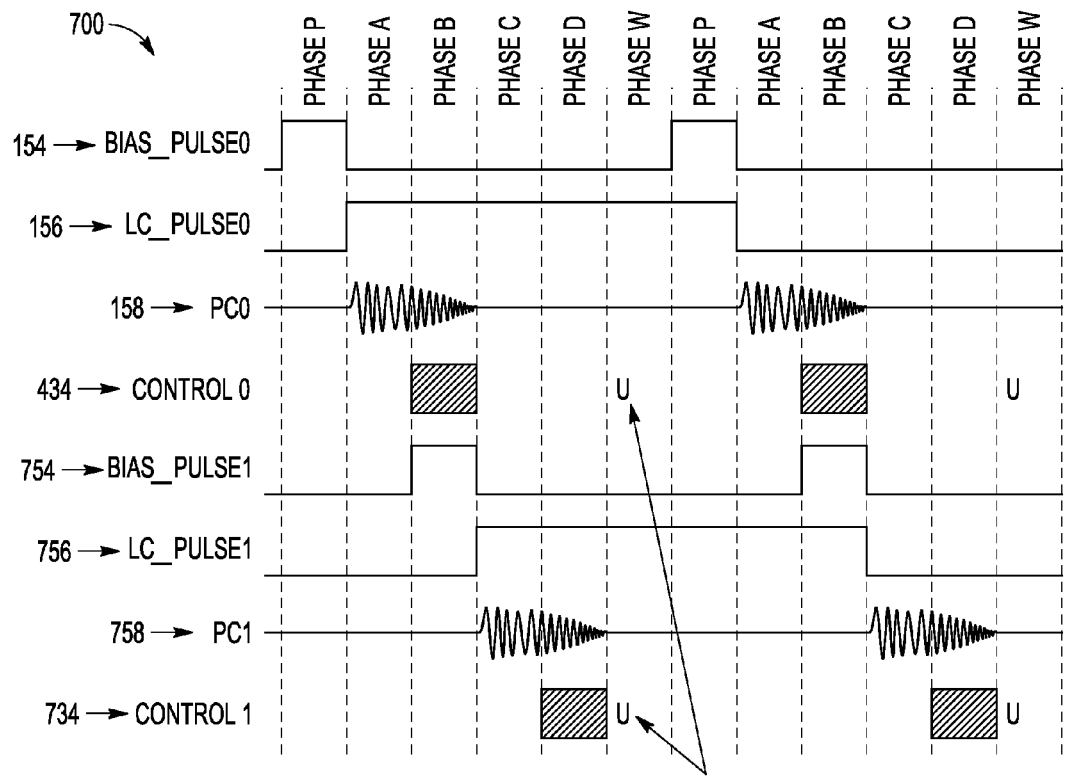
FIG. 7 is a timing diagram of output signals and control signals for the meter reader integrated circuit of FIG. 6.

FIG. 7 is a timing diagram 700 of output and control signals for the meter reader integrated circuit of FIG. 6. Timing diagram 700 includes bias pulse signal 154, excitation pulse signal 156, received signal (signal 158), and control signal 434. Timing diagram 700 further includes bias pulse signal 754, excitation pulse signal 756, received signal 758, and control signal 734. In this example, bias pulse signal 154 is asserted during pre-conditioning phase P. At the beginning of phase A, excitation pulse 156 transitions from a logic low level to a logic high level, exciting oscillations in signal 158, which oscillations slowly die out over phases A and B. Control signal 434 enables counter 134 during phase B to count the oscillations.

During phase B, bias pulse signal 754 is applied to the second resonant tank. At the beginning of phase C, bias pulse 154 and excitation pulse 156 remain unchanged and the ringing of signal 158 has died out. However, bias pulse 754 transitions from a logic high to a logic low level, and excitation pulse 756 transitions from a logic low level to a logic high level, exciting the second resonant circuit to produce signal 756 including multiple oscillations, which are counted during phase D based on the assertion of control signal 734. At the end of phase D, the counters are updated as indicated by the letters "u" and reference numeral 702.

In this example, the counting process switches between resonant circuits such that oscillations from one resonant circuit are counted during phase B and oscillations from the other resonant circuit are counted during phase D, with counters 134 and 136 being updated after phase D is completed. In other examples, the excitation pulse transitions and the updates may be more or less frequent.

The illustrated example shows a quadrature example where each phase is 1 RTC clock pulse wide. The output of comparator 140 is used to clock counter 144. The output of comparator 340 will be used to clock counter 344. For bias signal 154 and excitation signal 156, the polarity pulses low and returns high. For bias signal 754 and excitation signal 756, the polarity pulses high and returns low. Control signals 434 and 734 represent phase selection signals to enable counters 144 and 344 in phases B and D, respectively. In this example, after phase D, the results from counters 144 and 344 are checked by their discriminators 146 and 346, respectively, against their digital thresholds 308 and 316, and the results are sent to the state machine 132.

In general, the pulse counter supports a variety of modes that combine different settings to select single-ended or differential sensing, counting of oscillations or sampling and holding, and determining the excitation pulse width as a multiple of the RTC, a precise timed excitation pulse width, or an excitation pulse width terminated by an external rising or falling stop signal.

Figure 8:
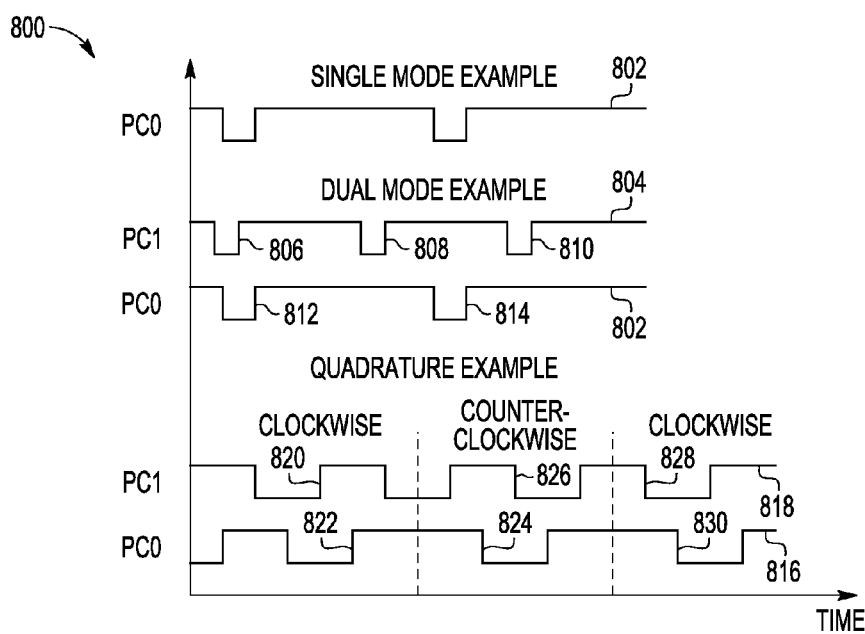
FIG. 8 is a timing diagram of input signals depicting single mode, dual mode, and quadrature mode of operation of the meter reader integrated circuit of FIG. 6.

FIG. 8 is a timing diagram 800 of input signals depicting single mode, dual mode, and quadrature mode of operation of the meter reader circuit 600 of FIG. 6 coupled to reed switch circuit 604 and/or reed switch circuit 606 or resonant circuits 104 or 609. Timing diagram depicts an input signal 802 on pad 602 in a single mode example, inputs signals 802 and 804 on pads 602 and 608, respectively, in a dual mode example, and inputs signals 816 and 818 on pads 602 and 608, respectively, in a quadrature mode example.

For a reed switch implementation, for single mode, input signal 802 is provided to comparator 610 and ultimately provided by state machine 132 to counter 134. In the dual mode, the input signal 802 is provided to comparator 610 and ultimately provided by state machine 132 to counter 134 while the input signal 804 is provided to comparator 616 and to counter 136 through operation of state machine 132. Thus, pulses 806, 808, and 810 of input signal 804 would be recorded in counter 136, while pulses 812 and 814 of input signal 802 would be recorded in counter 134.

In the quadrature mode for a reed switch implementation, state machine 132 sends clockwise counts to counter 134 while counter clockwise counts are sent to counter 136. The direction of rotation (clockwise or counter clockwise) is determined based on the relative timing of the rising and falling edges of input signals 816 and 818. For example, if the position of the reed switch circuits relative to one another and to the rotating wheel is such that clockwise rotation would affect the reed switch circuit 606 before affecting the reed switch circuit 604, then the transition edge of signal 818 would lead the transition edge of signal 816. In the illustrated example, rising edge 820 of input signal 818 leads the rising edge 822 of input signal 816 indicating a clockwise rotation of rotating wheel that causes reed switch circuit 606 to transition before reed switch circuit 604.

In contrast, the falling edge transition 824 of input signal 816 leads the falling edge transition 826 of input signal 818, indicating a counter-clockwise rotation. The falling edge transition 828 leads the falling edge transition 830 indicating a clockwise rotation.

In the example of FIG. 8, the single, dual and quadrature modes are described with respect to a reed switch implementation. However, the circuit of FIG. 6 can be used with either resonant circuits 104 and 609 or reed switch circuits 604 and 606. Accordingly, the single, dual and quadrature modes can also be used in conjunction with resonant circuits 104 and 609 or even for sample and hold circuit implementations.

Thus, in conjunction with the circuits and methods described above with respect to FIGS. 1-8, an integrated circuit is disclosed that excites a resonant circuit and counts a number of oscillations in the resulting sinusoidal signal to determine a rotational position of a metering wheel relative to the resonant circuit. Further, the integrated circuit is configurable to couple to one or more reed switch circuits and to operate in a reed switch mode to allow the same circuit to be utilized with different types of meter reader circuits.

In a particular example, an apparatus is coupled to a flow meter for measuring fluid flow. The apparatus includes a resonant circuit positioned near a moveable element (such as a rotating wheel having metalized and non-metalized portions) of a flow meter. The resonant circuit has an input and an output and is to produce a signal (such as an oscillating signal) in response to an excitation pulse. The apparatus further includes an integrated circuit coupled to the input and the output of the resonant circuit. The integrated circuit is configured to apply an excitation pulse to the input, to receive the signal in response thereto, and to detect a number of oscillations of the signal that exceed a pre-determined threshold. The integrated circuit is configured to determine a relative position of the moveable element based the number of oscillations.

Although the present invention has been described with reference to preferred embodiments, workers skilled in the art will recognize that changes may be made in form and detail without departing from the spirit and scope of the invention.

What is claimed is:

1. An integrated circuit comprising:
an output;
an input;
a pulse generator to provide an excitation pulse to the output;
a comparator including a first input, a second input, and an output, the first input coupled to the input to receive a signal in response to the pulse generator providing the excitation pulse, the comparator configured to compare the signal to a threshold at the second input to produce a comparator output signal corresponding to oscillations in the signal;
a counter including an input coupled to the output of the comparator and including an output, the counter configured to count pulses in the comparator output signal; and
a discriminator circuit including a first input coupled to the output of the counter and including a second input to receive a damping threshold, the discriminator circuit to compare a count value of the counter to the damping threshold, the discriminator circuit configured to provide an output signal having a first value when the count value is equal to or exceeds the damping threshold, and otherwise having a second value.

2. The integrated circuit of claim 1, further comprising a processor coupled to the discriminator circuit and configured to determine movement of a movable element of a flow meter in response to the output signal.

3. The integrated circuit of claim 2, wherein the processor updates a first counter when the output signal has the first value and updates a second counter when the output signal has the second value.

4. The integrated circuit of claim 1, further comprising a bias circuit configured to apply a bias signal to the output terminal before the pulse generator provides the excitation pulse.

5. The integrated circuit of claim 1, further comprising:
a second input;
a second comparator including a first comparator input coupled to the second input to receive a second signal, and including a second comparator input to receive a second threshold, the second comparator to compare the second signal to the second threshold to produce a second comparator output signal corresponding to oscillations in the second signal;
a second counter to count pulses in the second comparator output signal; and
a second discriminator circuit including a first input coupled to the second counter and a second input to receive a second damping threshold, the second discriminator to compare a second count value of the second counter to a second damping threshold and for providing a second output signal having the first value when the second count value is equal to or exceeds the second damping threshold and otherwise having the second value.

6. The integrated circuit of claim 5, further comprising:
a second output of the integrated circuit; and
a second pulse generator configured to provide a second excitation pulse to the second output of the integrated circuit.

7. The integrated circuit of claim 6, further comprising a phase timing control circuit configured to control the pulse generator to provide the excitation pulse at a first time and for a first duration and the second excitation pulse at a second time and for a second duration.

8. The integrated circuit of claim 5, further comprising:
first and second rotation counters; and
a state machine coupled to the discriminator circuit, the second discriminator circuit, and the first and second rotation counters, the state machine to receive a first signal from the discriminator and a second signal from the second discriminator and to update a selected one of the first and second rotation counters in response to receiving the first and second signals.

9. The integrated circuit of claim 5, further comprising a state machine configured to determine a direction of fluid flow through a flow meter based on timing of transitions within a first signal from the discriminator and a second signal from the second discriminator.

10. The integrated circuit of claim 5, further comprising a state machine configured to determine a direction of fluid flow through a flow meter based on timing of transitions of a first output of a first sample and hold circuit coupled to an output of the comparator circuit and a second output of a second sample and hold circuit coupled to an output of the second comparator circuit.

11. An integrated circuit comprising:
an input configured to couple to an external circuit to receive a resonant signal;
an output configured to couple to the external circuit;
a bias circuit coupled to the output and configured to provide an excitation pulse to the output;
a comparator including a first input coupled to the input and configured to receive the resonant signal, the comparator further including a second input configured to receive a threshold value, and including an output to provide an output signal, the output signal including a plurality of pulses corresponding to oscillations in the resonant signal that exceed the threshold value;
a counter including an input coupled to the output of the comparator and including an output, the counter configured to count pulses in the output signal of the comparator and to provide a signal representing a count value to the output of the counter; and
a discriminator circuit configured to compare the count value to a damping threshold and to provide a discriminator output signal in response to the comparison.

12. The integrated circuit of claim 11, further comprising:
a state machine coupled to the discriminator circuit and configured to determine movement of a movable element of a flow meter in response to the discriminator output signal; and
wherein the discriminator output signal has a first value when the count value is equal to or exceeds the damping threshold, and otherwise has a second value.

13. The integrated circuit of claim 12, wherein the state machine updates a first counter when the discriminator output signal has the first value and updates a second counter when the output signal has the second value.

14. The integrated circuit of claim 11, further comprising:
a second input of the integrated circuit;
a second comparator having a first comparator input coupled to the second input to receive a second signal, a second comparator input to receive a second threshold, and a comparator output, the second comparator configured to compare the second signal to the second threshold to produce a second comparator output signal corresponding to oscillations in the second signal at the output;
a second counter coupled to the comparator output of the second comparator to count pulses in the second comparator output signal; and
a second discriminator circuit coupled to the second counter and configured to compare a second count value of the second counter to a second damping threshold, the second discriminator circuit configured to provide a second output signal having the first value when the second count value is equal to or exceeds the second damping threshold and otherwise having the second value.

15. The integrated circuit of claim 14, further comprising:
a first output of the integrated circuit;
a second output of the integrated circuit;
a first pulse generator configured to provide a first excitation pulse to the first output of the integrated circuit; and
a second pulse generator configured to provide a second excitation pulse to the second output of the integrated circuit; and
wherein the first comparator receives the resonant signal in response to the first excitation pulse and the second comparator receives the second signal in response to the second excitation pulse.

16. A method comprising:
comparing a resonant signal at a first input of a comparator of an integrated circuit to a threshold value at a second input of the comparator to produce a comparator output signal, the comparator output signal including a plurality of pulses corresponding to oscillations in the resonant signal that exceed the threshold value;
counting pulses in the comparator output signal using a counter circuit of the integrated circuit to produce a count value;
comparing, using a discriminator of the integrated circuit, the count value to a damping threshold; and
providing a discriminator output signal at an output of the discriminator in response to comparing, the discriminator output signal having a first value when the count value is equal to or exceeds the damping threshold, and otherwise having a second value.

17. The method of claim 16, wherein before comparing the resonant signal, the method further comprising:
providing, using a pulse generator of the integrated circuit, an excitation pulse to a generator output coupled to an output of the integrated circuit; and
wherein the comparator receives the resonant signal from an input of the integrated circuit in response to the pulse generator providing the excitation pulse.

18. The method of claim 16, further comprising determining, using a state machine of the integrated circuit that is coupled to the discriminator, movement of a movable element of a flow meter in response to the discriminator output signal.

* * * * *